US006674583B2

(12) United States Patent
Beguiristain et al.

(10) Patent No.: US 6,674,583 B2
(45) Date of Patent: Jan. 6, 2004

(54) FABRICATION OF UNIT LENSES FOR COMPOUND REFRACTIVE LENSES

(75) Inventors: Hector R. Beguiristain, Oakland, CA (US); Jay T. Cremer, Palo Alto, CA (US); Melvin A. Piestrup, Woodside, CA (US)

(73) Assignee: Adelphi Technology, Inc., Palo Alto, CA (US)

( * ) Notice: Subject to any disclaimer, the term of this patent is extended or adjusted under 35 U.S.C. 154(b) by 0 days.

(21) Appl. No.: 10/179,089

(22) Filed: Jun. 25, 2002

(65) Prior Publication Data

US 2003/0089856 A1 May 15, 2003

Related U.S. Application Data

(60) Provisional application No. 60/301,107, filed on Jun. 25, 2001.

(51) Int. Cl.[7] ............................ G02B 9/00; G02B 25/00

(52) U.S. Cl. ....................... 359/754; 359/646; 359/796; 359/717

(58) Field of Search ................................ 359/646, 642, 359/742, 754, 796, 797, 809, 717; 378/145

(56) References Cited

U.S. PATENT DOCUMENTS 5,684,852 A * 11/1997 Tomie ........................ 378/145

* cited by examiner

*Primary Examiner*—Georgia Epps
*Assistant Examiner*—M. Hasan
(74) *Attorney, Agent, or Firm*—Joseph Smith

(57) ABSTRACT

A compound refractive lens for focusing, collecting, collimating and imaging with x-rays comprising N unit lenses numbered i=1 through N unit lenses substantially aligned along an axis such that i-th lens having a displacement $t_i$ orthogonal to said axis, with said axis located such that the sum of the lens displacements $t_i$ equals zero, and wherein each of said unit lenses comprises a lens material of lithium, carbon, or polyimide. A method for molding and housing the unit lenses is provided such that the unit lens have high surface and optical quality, and do not chemically deteriorate due to absorption of water or oxidation.

28 Claims, 9 Drawing Sheets

FABRICATION OF UNIT LENSES FOR COMPOUND REFRACTIVE LENSES

CROSS REFERENCE TO RELATED APPLICATIONS

This invention claims priority from U.S. Provisional Patent Application No. 60/301,107 filed Jun. 25, 2001, by inventors Hector Raul Beguiristain, Jay Theodore Cremer, Melvin Arthur Piestrup, entitled "Fabrication of Unit Lenses for Compound Refractive Lenses."

STATEMENT REGARDING FEDERALLY SPONSORED R & D

This invention was made with Government support under contract DASG60-00-C-0043 awarded by U.S. Army Space and Missile Defense Command. The Government has certain rights in the invention.

TECHNICAL FIELD

The present invention relates to x-ray imaging of objects for medical, industrial and scientific applications; for example, it relates to the medical imaging of the human body, and the x-ray inspection of objects to determine content. New methods are presented for the fabrication of thin lenses by replicating high quality optical surfaces onto unit lenses for compound refractive lens systems for the focusing, collection, collimation, and general manipulation of x-rays. These lens systems will have medical, industrial and scientific applications.

BACKGROUND OF THE INVENTION a. Compound Refractive Lenses for X-Rays

Ordinarily a single lens would not appreciably affect x-rays. However, if many lenses of the same focal length, $f$, are stacked one after another, then the focal length can be reduced by the reciprocal of the number of lenses, $f/N$. This well-known effect is often utilized for optics in the visible spectrum as described for example in the text book by E. Hecht and A. Zajac, *Optics*, (Addison-Wesley, 1974), Chap. 5, pp. 99–166. For x-rays, the index of refraction is generally slightly less than 1; therefore, concave lenses will focus x-rays. If a single bi-concave lens has a focal distance of $$f = \frac{R}{2\delta}, \tag{1}$$

where R is the radius of curvature on-axis of the lens or the radius of the sphere, if the lens is spherical, and δ is a small number in the order of $10^{-7}$ to $10^{-5}$ for most materials at x-ray wavelengths. δ is the decrement of the complex index of refraction of the lens material expressed by $$n=1-\delta-i\beta, \tag{2}$$

A compound lens made up of N lenses has a focal length equal to $$f = \frac{R}{2N\delta}. \tag{3}$$

The focal length is reduced by 1/N. Thus, if a single lens had a focal length of 100 meters at a given radiation wavelength, a compound refractive lens of 100 unit lenses will give a 1 meter focal length. A prior art compound refractive lens is illustrated in FIG. 1, where a number of unit lenses are stacked in a series. The x-rays pass through each of the unit lenses 10. Every lens focuses the x-ray only slightly, but the total series of lenses will result in appreciable x-ray focusing. Focal lengths of less than 20 cm have been achieved for 8 keV x-rays.

In the prior art very low Z materials were suggested to be best for unit lenses. Beryllium was suggested by Yang (B. X. Yang "Fresnel and refractive lenses for X-rays", Nuclear Instruments and Methods in Physical Research A328 pp. 578–587 (1993)) to be the best material for making lenses. Yang's paper states that the best material possesses a large δ/β, where β and δ are the factors in the complex dielectric constant as given by Eqn. 2. This is roughly a measure of how much the material can bend x-rays relative to the amount of absorption. Both lithium and beryllium give large δ/β, and are deemed the best lens materials. Unfortunately, these metals have properties that make them both difficult to fabricate and to use. Lithium is very hygroscopic, chemically reactive, and easily bonds to other metals (such as debossing or compression molding tools made of brass or steel). Beryllium is expensive and extremely difficult to machine, and becomes highly toxic if airborne during the machining process.

In U.S. Pat. No. 6,269,145 B1, May 1998, by M. A. Piestrup, R. H. Pantell, J. T. Cremer and H. R. Beguiristain, entitled "Compound Refractive Lens for X-rays," lenses were made by compressing steel balls or metal compression molding pins on both sides of a thin plastic film and thin metallic sheets. (That patent is incorporated herein by reference.) The two steel balls or molding pins are arranged diametrically opposite one another and are pressed against the surface of the film forming a biconcave lens. The quality of the surface (or surface roughness) of the lens matches that of the surface of the ball or molding pin. Thus, by having high quality stainless steel balls or pins, one can achieve a high quality lens surface, which is critical in obtaining high quality x-ray focusing and imaging. Parabolic and other surfaces, such as Fresnel lenses, can be machined into brass and steel pins to make debossing or compression molding tools for making unit lenses.

In U.S. Pat. No. 6,269,145 B1, May 1998, by M. A. Piestrup et al, methods of stacking, aligning and containing the unit lenses are described.

In the literature (E. M. Dufresne, D. A. Arms, R. Clarke, N. R. Pereira, S. B. Dierker, D. Foster, "Lithium Metal for X-ray Refractive Optics", Appl. Phys. Lett., 79, 4085 (2001).), lithium lenses using a saw-tooth pattern have been demonstrated to focus x-rays. Separate individual unit lenses ("coin lenses") of lithium have not been fabricated because of difficulty of fabrication, environmental degradation of the lithium, and lens surface quality.

SUMMARY OF THE INVENTION

In accordance with preferred embodiments of the invention, a compound refractive lens for x-rays is provided which is made up of a plurality of individual unit lenses comprising a total of N in number, said unit lenses hereinafter designated individually with numbers i=1 through N, said unit lenses substantially aligned along an axis, said i-th lens having a displacement $t_i$ orthogonal to said axis, with said axis located such that $$\sum_{i=1}^{N} t_i = 0.$$

In addition each of said unit lenses is made up of a lens material selected from the group consisting of lithium, carbon, and polyimide, and having a refractive index decrement $\delta<1$ at a wavelength $\lambda<50$ Angstroms.

A nice feature of the present invention is that if provides for a stack of individual thin lenses ("coin" lenses) that have high quality surfaces. The invention permits the inexpensive fabrication of unit lenses for compound refractive lenses with appropriately shaped, high-quality, optical surfaces, such as paraboloidal, spherical or more complex required shapes such as Fresnel lenses. These unit lenses can be made of soft materials such as carbon, plastics, soft metals such as lithium, aluminum, and even harder metals such as beryllium. The invention permits the inexpensive fabrication of lithium unit lenses without the lithium sticking to the debossing or compression molding (lens shaping) tool. The invention permits the fabrication of optical quality unit lenses with optical surfaces that can minimize compound refractive lens aberrations and that may also improve image quality of the lenses such as paraboloidal, spherical or more complex optimized surfaces.

The invention also provides for an adequate housing for the unit lenses such that they are held in coaxial alignment, and are in a chemically inert environment, such as an inert gas or vacuum or dry-air environment, whereby the lithium lenses do not experience chemical change due to the presence of moisture or any other chemically active atoms or molecules.

DETAILED DESCRIPTION OF THE PREFERRED EMBODIMENTS a. Methods of Fabrication

In a preferred embodiment, the invention uses convex glass optical lenses as the debossing or compression-molding tool to fabricate the concave unit lenses in plastics, lithium, or other soft materials. Glass lenses have been fabricated for centuries with high quality optical surfaces (minimizing surface roughness) and, thus, when compressed against other materials (e.g. Kapton (polyimide), carbon or lithium), can make impressions in that material. If the glass lens has a convex parabolic or aspheric surface, then the impression left in the material is that of a concave lens. Glass is a rigid, hard material capable of high amounts of compression.

The pressing lenses of the described lens-forming apparatus can be made of harder materials having optical quality surfaces, such as sapphire, to allow them to be pressed onto lens material harder to deform and thus, replicate the pressing (e.g. glass) lenses' optical surfaces on the unit lenses. Hard lens materials such as beryllium can be debossed into lenses using sapphire balls in this manner forming biconcave lenses. In general, ordinary machined steel or brass debossing or compression molding tools are more expensive and often softer than commercially available glass lenses or sapphire balls.

Figures 2A, 2B, 2C:
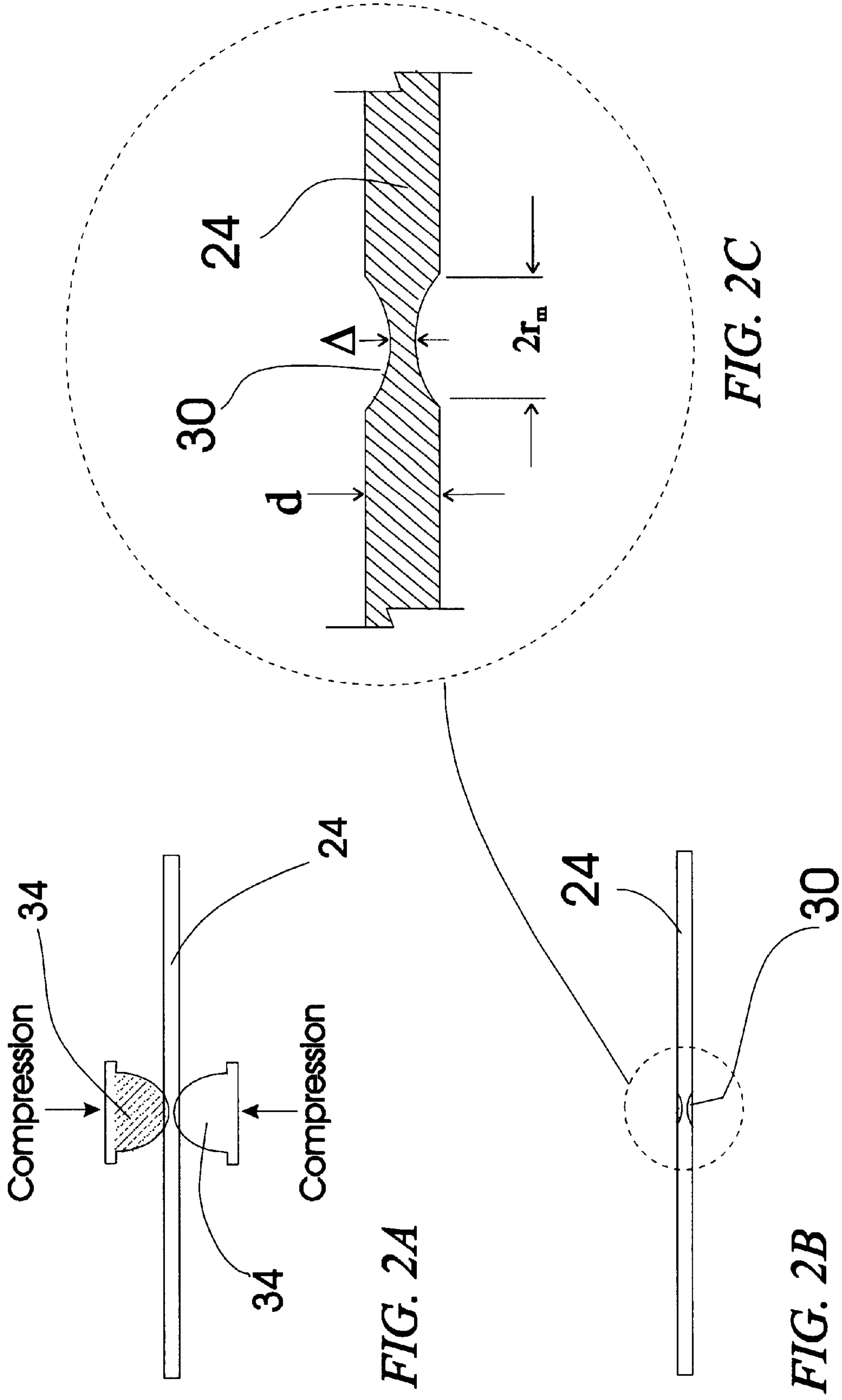
FIG. 2A shows a thin x-ray lens being made by two optical glass lenses 34 to form a bi-concave lens in a thin film 24 by compression.
FIG. 2B shows a side view of the thin x-ray lens of FIG. 2A.
FIG. 2C shows a blown up view of the lens of FIG. 2B.

The technique is shown in FIGS. 2A, 2B, 2C, and 3. In FIG. 2A two parabolic glass lenses 34 are pressed against a thin film either of plastic or soft metal 24 of thickness "d" making a concave parabolic impression 30 into the plastic or soft metal 24. As shown in FIG. 2B a concave lens 30 is produced of minimum thickness $\Delta$ and mechanical radius $r_m$. A blown up cross-section of the unit lens is shown in FIG. 2C.

Figure 3:
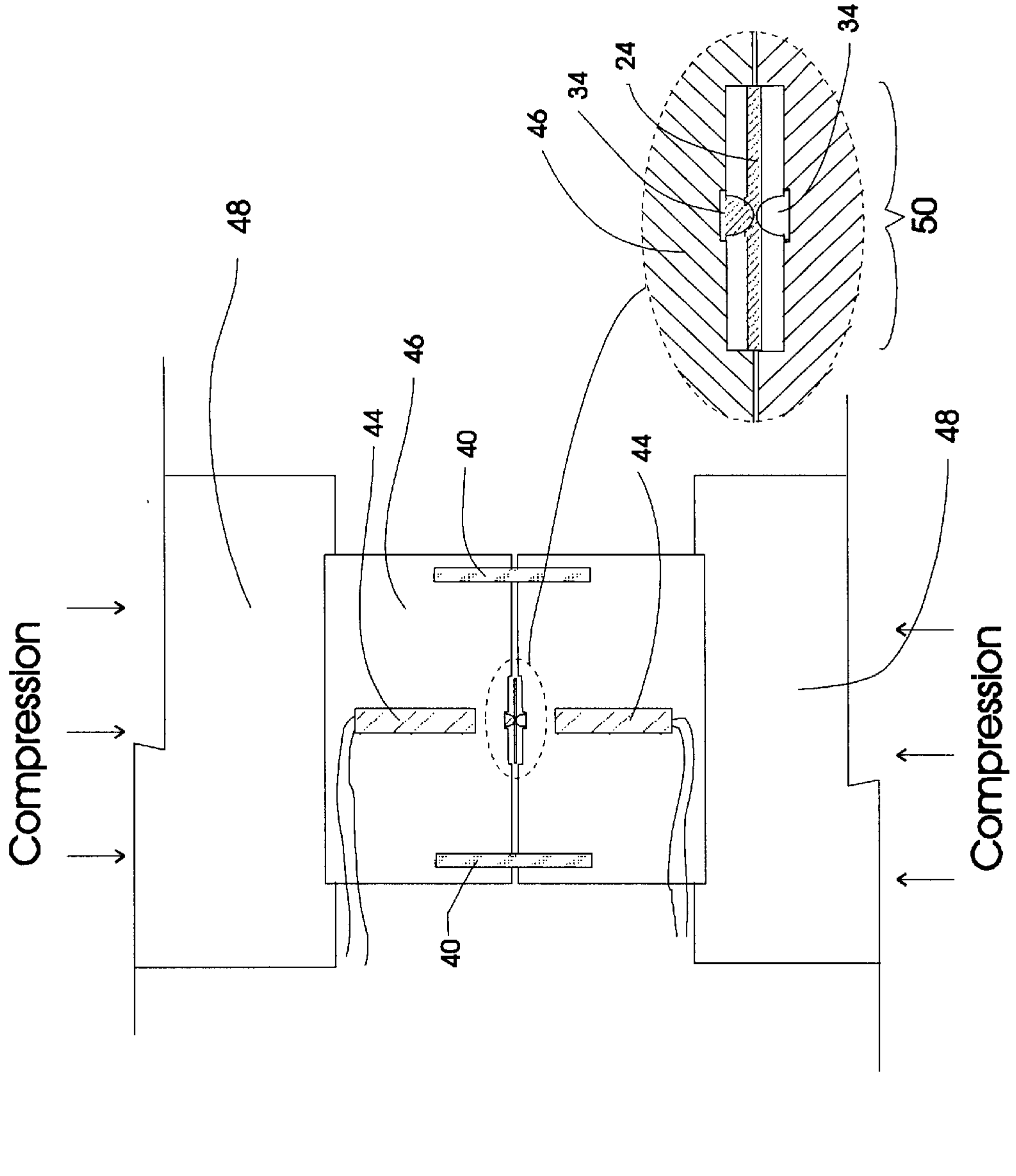
FIG. 3 shows a partial view of the compression jig for making unit lenses shown method of aligning the convex glass lenses.

FIG. 3 shows an apparatus that carefully aligns the two convex glass lenses 34 of FIG. 2A such that the glass lenses 34 are diametrically opposite one another (coaxial alignment). The two convex lenses act as negative molds or debossing tools to form a double concave unit lens 30 of FIG. 2C. As shown in FIG. 3, coaxial alignment between the two convex unit lenses is achieved by dowel pins 40 and support blocks 46 that guide the glass lenses 34 directly onto the thin film 24. The film 24 used in our proof-of-principle experiments was lithium (206 microns or 1.0 mm), but other plastics, such as Mylar or Kapton (25 to 125 microns), have also been used. Weight or compression is placed on top of the support blocks 46 by a mechanical press whose jaws 48 are shown in FIG. 3. Compression and then separation of the two glass lenses 34 is achieved by a standard mechanical press or small hydraulic press (not shown in FIG. 3).

Figure 1:
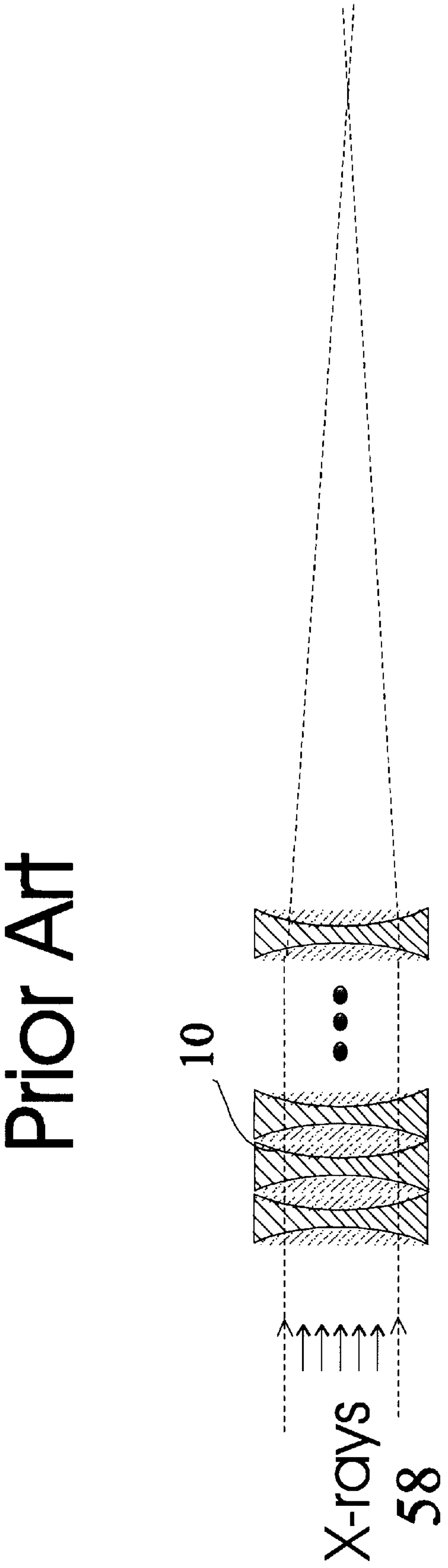
FIG. 1 shows a schematic diagram of a thin compound refractive lens composed of unit lenses 10 focusing x-rays 58.

The glass tool 34 is heated with a thermally heating element (e.g. a cartridge heater element 44) just behind the glass lens tool 34. The temperature of the glass lens 34 is raised to improve the debossing into the Kapton thin film 24. The high temperature of the glass lens 24 readily presses into the thin Kapton film 24 to form the concave unit lens 30. The thin Kapton foil 24 is circular and fits into a circular depression 50 in the aluminum support blocks 46. The circular depression 50 acts to support and concentrically align the Kapton foil 24 as it is being compressed so that every unit lens 10 when stacked is concentrically aligned with other unit lenses 10 as shown in FIG. 1.

The use of glasses or plastic lenses or spheres works well with materials such as lithium. Lithium binds with other metals such as steel, aluminum, or brass. Thus, if a steel parabolic tool were machined to compress lithium, the lithium would stick to the tool and the surface quality would be destroyed. On the other hand, lithium does not stick to glass or plastic lenses under compression. A glass or plastic tool in the form of a glass lens with a parabolic shape thus becomes an ideal tool for manufacturing lenses. Our proof-of-principle lithium lenses have shown that glass convex lenses do not stick into lithium but form smooth parabolic surfaces.

Figure 4A:
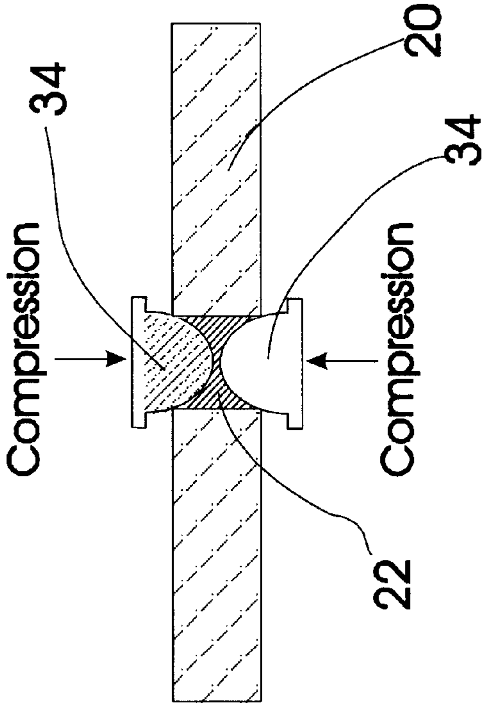
FIG. 4A shows a unit lens being made by two optical glass lenses 34 to form a bi-concave parabolic lens made of lithium.

In FIG. 4A we show how we manufactured a lithium unit lens using glass lenses as the compression tools. In the figure, two unit lenses 34 are used to compress lithium. Lithium 22 was placed inside an aluminum support disk 20. As in the case of FIG. 3, the convex glass lenses 24 are guided to the lithium 22 using a mechanical press whose jaws 48 are shown in the drawing. The heater element 44 in FIG. 3 can be used to improve the surface quality by heating the plastic or lithium causing flow. In the proof-of-principle experiment the lithium lenses were not heated.

The support disks 20 can be aluminum or iron or a metal, which readily sticks or adheres to lithium. The adherence of the lithium to metals will allow the lithium lens to remain attached to the disks without the need to resort to adhesives. As shown in FIG. 4A, a granule of lithium 22 is compressed and fills the inner diameter of the disk 22 forming a complete biconcave lens concentric to the disk center. The lithium lens diameter can be as large as the inside diameter of the disk. Like the Kapton film of FIG. 3, the aluminum disk is held in the circular depression 50 machined to the aluminum support disk's 20 dimensions so that it will not move during the compression. The lithium was compressed inside a glove box in a dry (very low moisture) atmosphere. The air in the glove box had a relative humidity of less than 1% and a dew-point of less than −30° C. The resulting lithium lens is shown in FIG. 2B. The lens aperture radius is $r_m$ and minimum thickness is Δ. The minimum thickness Δ of the unit x-ray lens is obtained by having the glass lenses 34 contact the edge of the aluminum support disk 20 at the desired unit lens diameter or aperture. Lithium compresses easily with little pressure. Excess lithium was forced out to the hole and scraped away after the compression.

Unit lithium or carbon lenses were also made using unsupported disk of lithium or carbon as shown in FIGS. 2A, 2B, and 2C. Disks 1" in diameter, 25 microns to 1 mm thick were used. Again glass parabolic lenses were used to compress the parabolic surface into the disk of lithium or carbon.

Alternatively, plastic spherical or aspheric lenses (e.g. used in visible optics) can be used as the debossing or compression molding tool to create biconcave impressions in the soft lithium metal foil or granule. Plastics such as Delrin can cut and deboss lithium without the problem of the lithium sticking to the plastic. A sphere or aspheric lens (such as a parabolic lens) made of Delrin, Teflon, polyethylene or other plastics can be used to deboss hemispherical or paraboloid, or other smooth cavities on each side of a lithium foil or granule, thereby forming a smooth surfaced biconcave focusing lens for x-rays.

In other embodiments, sapphire balls and sapphire aspheric lenses (such as parabolic lenses) readily available commercially can also be used as a debossing tool to create biconcave impressions into soft foils of lithium or carbon.

An axially aligned stack of these biconcave lithium lenses can be achieved by attaching the lithium lenses on disks such that the lens center is coaxial with the disk. The disks can then be stacked in a cylinder whose inside diameter is equal to the outside diameter of the disks. The inside diameter of the disks is larger than or equal to the diameter of the lithium biconcave lens to allow the x-rays to be focused to pass through only the lithium lens and not the absorptive material of the disk.

A thin coating of mineral oil placed on the lithium granule or foil prior to debossing can act to improve the smoothness of the surface of the lithium as it is debossed. This is accomplished by reducing the adherence of the lithium to the metal housing holding the plastic, glass, or sapphire debossing ball or aspheric lens as well as the metal housing on which the debossing element is mounted. Furthermore, a thin coating of the mineral oil may act as a protective layer for the lithium lens formed by debossing against small quantities of chemically reactive air and water vapor. A sufficiently thin layer of mineral oil should minimize the absorption of the x-rays.

b. Support and Containment of Lenses

To stack the unit lenses such that they form a compound refractive lens and achieve required alignment and support, numerous approaches are available and are discussed in U.S. Pat. No. 6,269,145 B1 May 1998, by M. A. Piestrup et al. However, lithium unit lenses not only require support and alignment but, also, an inert or dry-air environment in which the unit lenses are contained must be such that the lenses do not absorb moisture. Lithium reacts strongly with moisture to produce compounds (e.g. lithium nitride, lithium carbonate, and lithium hydroxide). Lithium also slowly reacts with nitrogen; thus, a vacuum or an inert gases such as helium or argon are better to use in the lens container. If the compound refractive lens of lithium is to be used in air, the container should have low x-ray-absorbing windows such as thin beryllium or Kapton to permit low loss transmission of the x-rays to the lens.

The parabolic or spherical unit lenses of the compound refractive lens must be aligned according to U.S. Pat. No. 6,269,145 B1 May 1998, by M. A. Piestrup et al. Assuming that the individual unit lenses of a total of N in number can be designated individually with numbers i=1 through N then the unit lenses should be substantially aligned along an average optical axis $$\left(\sum_{i=1}^{N} t_i = 0\right),$$

where the i-th lens having a displacement ti orthogonal to the average optical axis. The standard deviation $\sigma_t$ of the displacements $t_i$ about the average optical axis should be less than the minimum effective aperture of the compound refractive lens.

If the unit lenses of the compound refractive lens are Fresnel unit lenses, the alignment should be more accurate. The Fresnel lenses have a zone radii $r_m$, $r_{m-1}$, $r_{m-2}$, . . . , $r_0$. The displacements $t_i$ of the individual unit lenses are distributed such that there is a standard deviation $\sigma_t$ of the displacements $t_i$ about the average optical axis, such that $\sigma_t$ is less than the smallest zone ($r_m$-$r_{m-1}$).

Figure 4B:
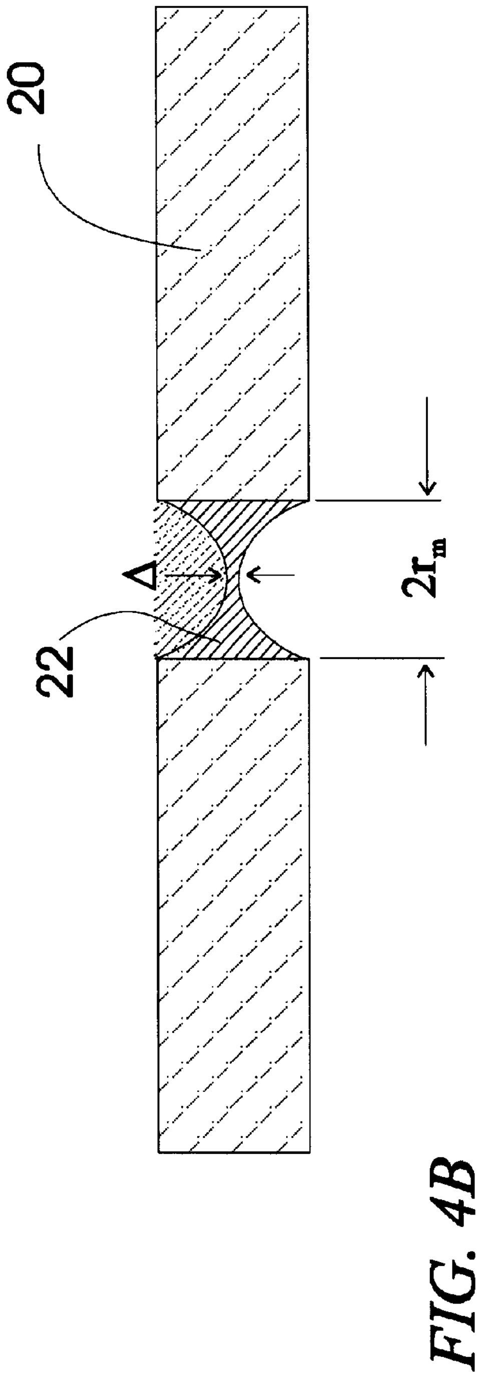
FIG. 4B shows a side view of the unit lens of FIG. 4A.
Figure 5:
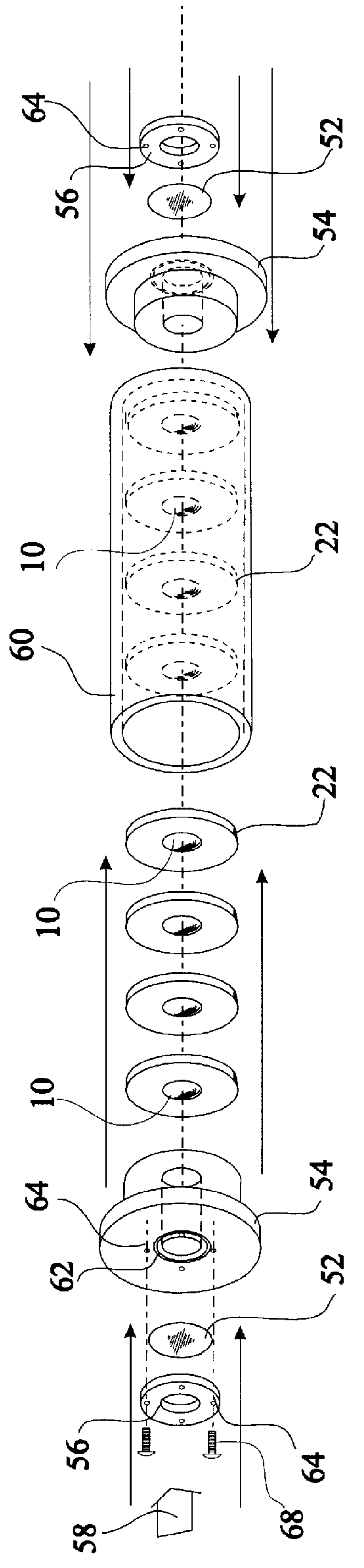
FIG. 5 shows a support, alignment, and environment containment means for a compound refractive lens using lithium.

One embodiment of how both support and environmental containment are achieved is shown in FIG. 5. Unit lenses 10 on lithium disks 22 are aligned by using the disk shape of the unit lens to stack them inside a support cylinder 18. Accuracy is achieved by machining the lithium disk 22 diameter to be slightly less than the inside diameter of the support cylinder 60. Various embodiments for the unit lenses of FIGS. 2 and 4 may be aligned and supported by placing them inside this support cylinder 60. FIG. 5 shows exploded view of the support cylinder 60 containing multiple unit lenses 10 compressed into lithium disks 22. The support cylinder 60 has two cylindrical plugs 54 that are fitted for either end of the support cylinder 60. These cylindrical plugs 54 have holes through their centers. They support two beryllium windows 52, which are compressed onto the Viton "O" ring 62 embedded in said plugs 54 by a window ring 56. The window ring 56 is held on to the plug 54 by screws 68. Screw holes 64 and thread 66 for passing and holding the screws 68 are shown in FIG. 5.

The support cylinder 60 is machined such that the Lithium disks 22 can be slipped into the cylinder. The plugs 54 with their thin beryllium windows 52 are placed on either end of the support cylinder 60 as a means to hold the lithium disks 22 inside the support cylinder 60 to maintain the unit lens 10 in alignment and to prevent air from entering. Inside the support cylinder 60 the environment can either be a vacuum, an inert gas such as argon or ultra-dry air (used in the proof-of-principle experiment, discussed below). Alignment accuracy of less than 25 $\mu$m can be easily achieved using this technique and still permit the unit lens 10 to be slipped into the support cylinder 60. A support ring can be part of the embodiment for use in supporting and aligning the entire structure in a laser gimbal mount. Those skilled in the art will understand that the exterior shape of support cylinder 60 is not significant. It merely serves as a support and an environmental housing for the unit lenses forming the compound refractive lens.

Another method for holding the compound refractive lens structure is to use alignment holes and alignment rods that will position and align the unit lenses, as was discussed in the prior patent of Piestrup et al. However, as one skilled in art will readily see, these methods must be provided with a housing wherein the lithium lenses are placed in a non-oxidizing environment. This could be achieved in an x-ray beamline (i.e. a vacuum pipe) that provides proper support and alignment and a vacuum for the compound refractive lens. Dry helium is also used in x-ray beamlines and would be an excellent gas environment for the lithium lens.

In another embodiment, the unit lenses can be first aligned using a variety of optical and visual techniques to insure that the lenses are aligned to have a common optical axis. The lenses would then be held together by using an adhesive. This could eliminate the support cylinder 60 Other methods of adhering the unit lenses together such as a low-moisture epoxy or a metal bonding (spot welding) would also be possible. The lenses would then be placed in a vacuum, helium, or other inert environment.

c. Proof of Principle Experiment

We have fabricated and tested a compound refractive lens made of lithium using the techniques of section (a), and using the support and containment means of section (b) depicted in FIG. 5. We have measured the intensity profile and transmission of x-rays focused by a compound refractive lens made of unit lithium lenses. The lithium compound refractive lens was composed of a series of 335 bi-concave, parabolic unit lenses each with an on-axis radius of curvature of 0.95 mm. Two-dimensional focusing was obtained at 8.0 keV with a focal length of 90 cm. The effective aperture of the compound refractive lens was measured to be 1030 $\mu$m. The measured peak transmission of the x-rays through the lens was 27%.

Figure 6:
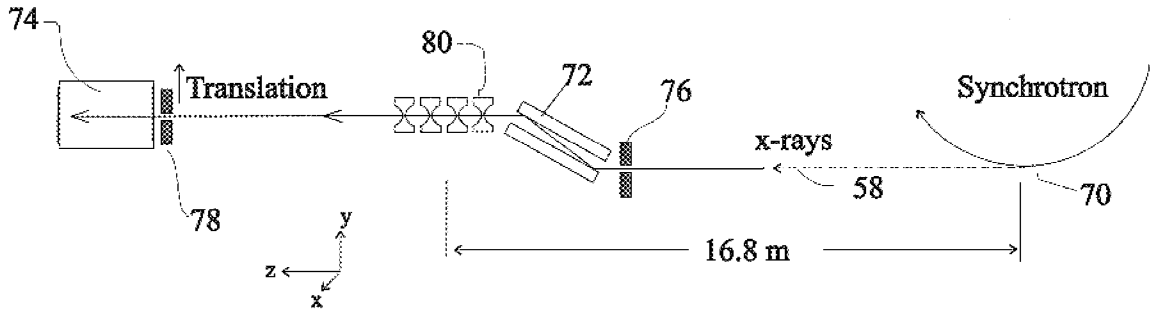
FIG. 6 shows schematic view of the experimental setup for testing the prototype lithium compound refractive lens.

To test the lithium compound refractive lens we used x-ray beamline 2–3 on the Stanford Synchrotron Radiation Laboratory's synchrotron. The experimental apparatus is shown in FIG. 6. The synchrotron x-ray source 70 was used to produce the x-rays 58 that were defined in photon energy by a double crystal monochromator 72 and defined spatially by an entrance slit 76 at the entrance to the lithium compound refractive lens 80.

The lithium compound refractive lens 80 was placed 16.8 meters from the synchrotron source 70 in a goniometer head (not shown in FIG. 6), which could be manually tilted in two axes. The lens 80 could also be translated orthogonally (x and y) to the direction of the x-ray beam. These adjustments maximize the x-ray transmission though the lens by aligning it with the beam. As shown in FIG. 6, the distance from the synchrotron x-ray source 70 to compound refractive lens was 16.8 meters. An ionization chamber 74 was used to detect the x-ray power. The x-ray beam was profiled using a translatable slit 78 made of tantalum. The translatable slit 78 was moved across the focused x-ray beam (y and x axes) and the current monitored from the ionization chamber 74. Since the ionization chamber 74 was downstream of the slit 78, it measured the x-ray power passing through them. The profile of the x-ray beam coming from the compound refractive lens 80 was thus obtained. We manually moved the translatable slits 78 along the z-axis of the x-ray beam measuring its vertical and horizontal width by scanning the slits over the beam at each location.

Figure 8:
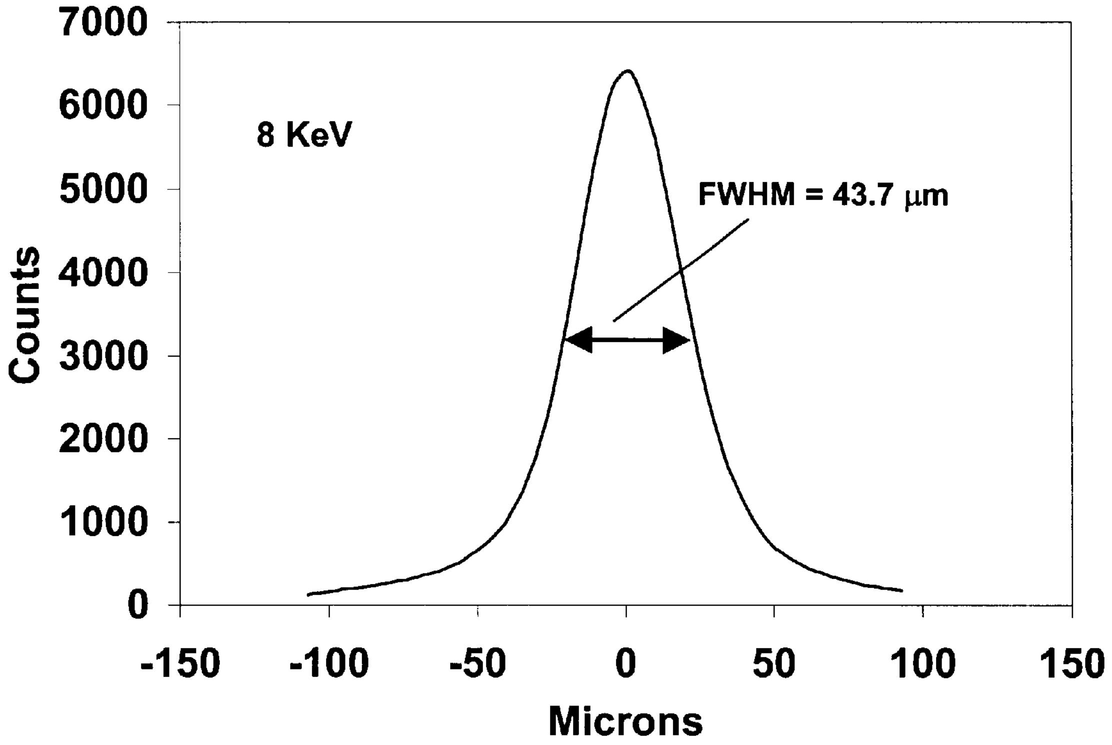
FIG. 8 shows the FWHM intensity profile of the 8.0-keV x-ray spot produced by parabolic lithium compound refractive lens at the image plane.

The ionization chamber 74 with a translatable Ta slit 78 was used to profile the x-ray beam. The width of the exit-slit's was adjusted to below 25 $\mu$m by using a thin, stainless steel shim. After adjusting its width, the exit slit was then translated in the x and y-directions across the focused x-ray beam. The ionization chamber 74 was downstream of the slits 78 so that it measured the total x-ray power passing through it and, hence, when correlated with the position of the slit, gave the intensity profile of the beam (e.g. FIG. 8).

Figure 7:
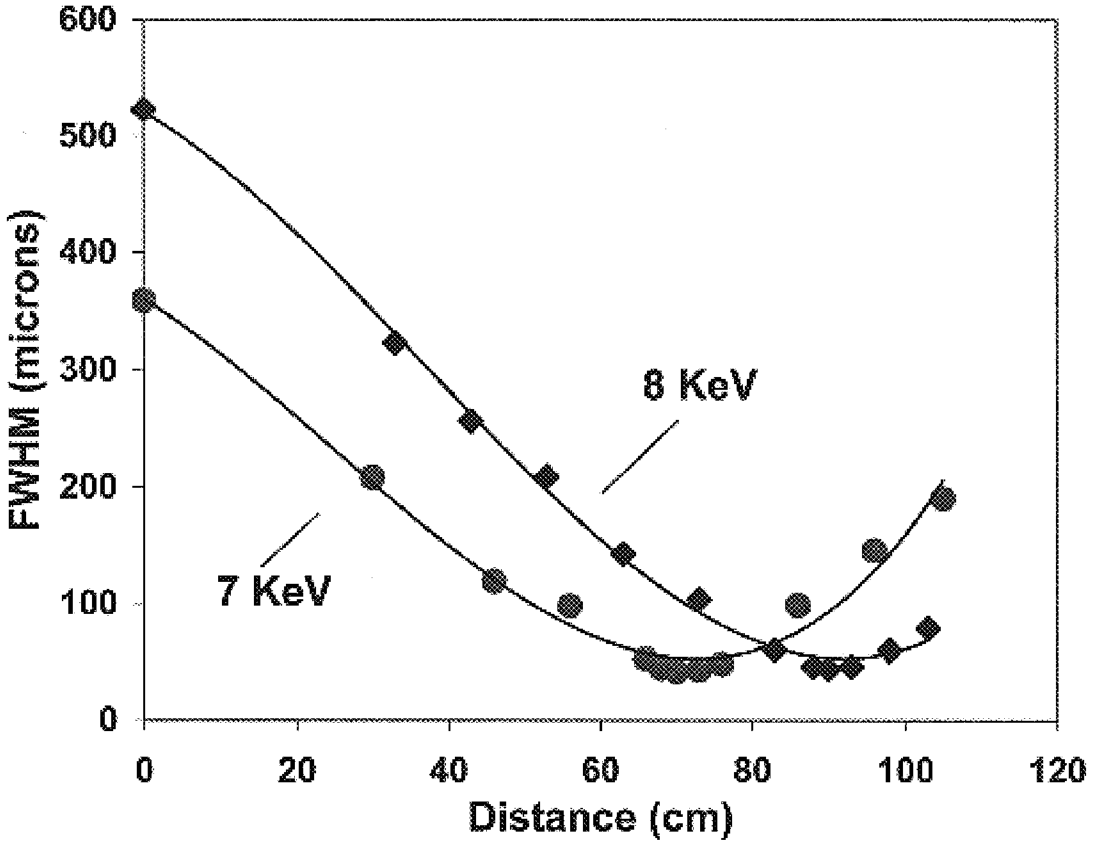
FIG. 7 shows the vertical full-width-half-maximum (FWHM) profile of 8.0 keV x-rays focusing along the propagation direction.

Various profiles of the x-ray beam along the propagation direction were obtained by placing the exit slit at different positions along the z-axis of the x-ray beam. Vertical and horizontal widths were measured by scanning the horizontal and vertical slits respectively over the beam at each location in the z-axis. The profile of the beam as a function of distance from the lens was plotted using these measured widths. FIG. 7 shows a series of vertical dimensions of the spot of 8.0 keV photons as a function of distance along the propagation direction from the lithium compound refractive lens. The minimum waist of 43.7 $\mu$m is seen to be at the image distance of 90 cm downstream from the lens. The measured image spot profile is displayed in FIG. 8. The measured FWHM spot size of the image, 43.7 microns, is almost twice as large as would be expected from the geometric optics demagnification calculation of 24.8 microns. The latter can be attributed either to surface irregularities on the lithium unit lenses or the uncertainty of the source size.

Figure 9:
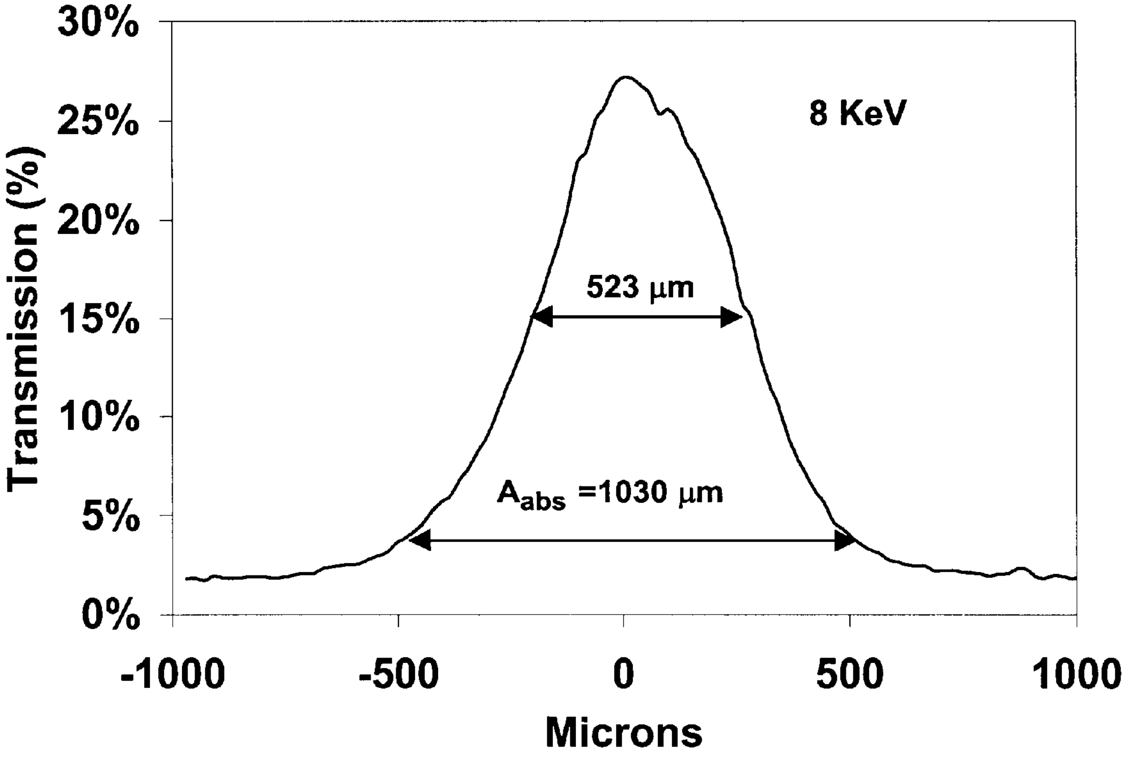
FIG. 9 shows the measured x-ray transmission through the compound refractive lens as a function of the radius of the lens.

The stronger attenuation of the rays that pass through outer radial regions of the lithium compound refractive lens results in the lens system having an aperture with a Gaussian shaped transmission profile. The transmission profile across the lithium compound refractive lens was obtained by normal translation of the lens across a very narrow 25×25 $\mu m^2$ x-ray beam. FIG. 9 shows the profile of the transmission at 8 keV through the prototype lithium compound refractive lens. The lithium compound refractive lens measured in this manner had a FWHM of 523 $\mu$m. The attenuation aperture $A_{abs}$, is calculated at 8 keV to be 1263 $\mu$m, which coincides with the measured attenuation aperture of 1030 $\mu$m wide that is displayed in FIG. 8.

Given the measured transmissions and profiles, one can determine the gain of a compound refractive lens. The measured gain is 18.9 compared to the calculated gain of 80.4. Surface irregularities deviating from parabolic surface, misalignment of the individual lenses in the compound refractive lens, and uncertainty in the source size are thought to be responsible for the lower measured values of the gain compared to the expected theoretical value of the lithium compound refractive lens. The relatively low calculated (and measured) gain value is thought to be primarily due to the large source size. If the same lens is placed on a beam line using a third generation x-ray source, the gain of the compound refractive lens can be substantially higher. These sources can possess spot sizes that are a factor of ~120 times smaller (e.g. 0.02 by 0.3 $mm^2$). Also, typical distances from the insertion devices to the end stations can be ~60 m, compared to 16.8 m in our experiment. These longer object distances $r_0$ would consequently increase the gain by a factor of $(60/16.8)^2$; i.e. 12.7. For these source and placement parameters, the theoretical gain evaluated at 8.0 keV would have been $1.2\times10^5$ for the lithium compound refractive lens used in this experiment. This results in a very sizable increase of the beam intensity from the case where no lens is used.

This prototype lithium compound refractive lens has the largest aperture from any previously reported compound refractive lens at any energy. Also, higher gains under comparable conditions are achievable with this compound refractive lens at the design energy than any other previously reported. Furthermore, lithium compound refractive lenses can substantially outperform lenses built out of higher atomic-number materials at energies below 30 keV. The peak transmission of the lens, i.e. transmission along the lens axis, was found to be 27% at 8.0 keV. Decreasing the minimum wall thickness, Δ (see FIG. 2C) can further increase transmission and gain. The use of the compound refractive lenses at these x-ray energies can have wide application in synchrotron and novel x-ray sources. For example such compound refractive lens could improve and enhance x-ray microscopy, x-ray diffraction, and medical imaging techniques.

We claim:

1. A compound refractive lens for x-rays, comprising:

a plurality of individual unit lenses comprising a total of N in number, said unit lenses hereinafter designated individually with numbers i=1 through N, said unit lenses substantially aligned along an axis, said i-th lens having a displacement $t_i$ orthogonal to said axis, with said axis located such that $$\sum_{i=1}^{N} t_i = 0$$

wherein each of said unit lenses comprises a lens material selected from the group consisting of lithium, carbon, and polyimide, and having a refractive index decrement δ<1 at a wavelength λ<50 Angstroms; and wherein each of said individual unit lenses is an independent separate physical unit that can be stacked relative to other of said unit lenses.

2. A compound refractive lens for x-rays, comprising:

a plurality of individual unit lenses comprising a total of N in number, said unit lenses hereinafter designated individually with numbers i=1 through N, said unit lenses substantially aligned along an axis, said i-th lens having a displacement $t_i$ orthogonal to said axis, with said axis located such that $$\sum_{i=1}^{N} t_i = 0;$$

wherein each of said unit lenses comprises a lens material selected from the group consisting of lithium, carbon, and polyimide, and having a refractive index decrement δ<1 at a wavelength λ<50 Angstroms compound refractive lens according to claim 1; and wherein said unit lenses are aligned and held together in a cylinder.

3. A compound refractive lens according to claim 2, wherein each unit lens comprises a polyimide substrate.

4. A compound refractive lens as in claim 2, wherein each of said individual unit lenses comprises a polyimide substrate.

5. A compound refractive lens as in claim 1, wherein each of said individual unit lenses comprises a polyimide substrate, and wherein said unit lenses are held together by an adhesive.

6. A compound refractive lens as in claim 1, wherein each of said individual unit lenses comprises a carbon substrate, and wherein said unit lenses are held together by an adhesive.

7. A compound refractive lens as in claim 1, wherein each of said individual unit lenses comprises a polyimide substrate, and wherein said unit lenses are held together by a metal bonding method.

8. A compound refractive lens as in claim 1, wherein each of said individual unit lenses comprises a carbon substrate, and wherein said unit lenses are held together by a metal bonding method.

9. A compound refractive lens for x-rays, comprising:

a plurality of individual unit lenses comprising a total of N in number, said unit lenses hereinafter designated individually with numbers i=1 through N, said unit lenses substantially aligned along an axis, said i-th lens having a displacement $t_i$ orthogonal to said axis, with said axis located such that $$\sum_{i=1}^{N} t_i = 0;$$

wherein each of said unit lenses comprises a lens material selected from the group consisting of lithium, carbon, and polyimide, and having a refractive index decrement δ<1 at a wavelength λ<50 Angstroms;

wherein said displacements $t_i$ are distributed such that there is a standard deviation $\sigma_t$ of said displacements $t_i$ about said axis; and wherein each of said unit lenses is a Fresnel refractive lens having a zone radii $r_m, r_{m-1}, r_{m-2}, \ldots, r_o$ such that $\sigma_t$ is less than the smallest zone $(r_m - r_{m-1})$.

10. A compound refractive lens according to claim 9, wherein the unit lenses are aligned and held together in a cylinder.

11. A compound refractive lens as in claim 9, wherein each of said individual unit lenses comprises a polyimide substrate, and wherein said unit lenses are held together by an adhesive.

12. A compound refractive lens as in claim 9, wherein each of said individual unit lenses comprises a carbon substrate, and wherein said unit lenses are held together by an adhesive.

13. A compound refractive lens as in claim 9, wherein each of said individual unit lenses comprises a polyimide substrate, and wherein said unit lenses are held together by a metal bonding method.

14. A compound refractive lens as in claim 9, wherein each of said individual unit lenses comprises a carbon substrate, and wherein said unit lenses are held together by a metal bonding method.

15. A compound refractive lens as in claim 9, wherein each of said individual unit lenses comprises a polyimide substrate.

16. A compound refractive lens as in claim 2, wherein each of said individual unit lenses comprises a carbon substrate.

17. A compound refractive lens as in claim 2, wherein each of said individual unit lenses comprises a carbon substrate.

18. A compound refractive lens for x-rays, comprising:

a plurality of individual unit lenses comprising a total of N in number, said unit lenses hereinafter designated individually with numbers i=1 through N, said unit lenses substantially aligned along an axis, said i-th lens having a displacement $t_i$ orthogonal to said axis, with said axis located such that $$\sum_{i=1}^{N} t_i = 0;$$

wherein each of said unit lenses is made of lithium and has a refractive index decrement $\delta<1$ at a wavelength $\lambda<50$ Angstroms; and wherein each of said individual unit lenses is an independent separate physical unit that can be stacked relative to other of said unit lenses.

19. A compound refractive lens for x-rays, comprising:

a plurality of individual unit lenses comprising a total of N in number, said unit lenses hereinafter designated individually with numbers i=1 through N, said unit lenses substantially aligned along an axis, said i-th lens having a displacement $t_i$ orthogonal to said axis, with said axis located such that $$\sum_{i=1}^{N} t_i = 0;$$

wherein each of said unit lenses comprises lithium, and has a refractive index decrement $\delta<1$ at a wavelength $\lambda<50$ Angstroms;

wherein said displacements $t_i$ are distributed such that there is a standard deviation $\sigma_t$ of said displacements $t_i$ about said axis; and wherein each of said unit lenses is a Fresnel refractive lens having a zone radii $r_m, r_{m-1}, r_{m-2}, \ldots, r_o$ such that $\sigma_t$ is less than the smallest zone $(r_m-r_{m-1})$.

20. A compound refractive lens according to claim 19, wherein the unit lithium lenses are held together by an adhesive.

21. A compound refractive lens according to claim 19, wherein the unit lithium lenses held together using a metal bonding method.

22. A compound refractive lens according to claim 19, wherein the unit lithium lenses are held together by a fastener.

23. A compound refractive lens according to any one of claims 18, 19, 25, 26, 27, 28, 29, 21, or 22, wherein the unit lithium lenses are contained in a chemically inert environment.

24. A compound refractive lens according to claim 19, wherein the unit lenses are aligned and held together in a cylinder.

25. A compound refractive lens for x-rays, comprising:

a plurality of individual unit lenses comprising a total of N in number, said unit lenses hereinafter designated individually with numbers i=1 through N, said unit lenses substantially aligned along an axis, said i-th lens having a displacement $t_i$ orthogonal to said axis, with said axis located such that $$\sum_{i=1}^{N} t_i = 0;$$

wherein each of said unit lenses is made of lithium and has a refractive index decrement $\delta<1$ at a wavelength $\lambda<50$ Angstroms; and wherein the unit lithium lenses are held and aligned by a plurality of alignment pins.

26. A compound refractive lens for x-rays, comprising:

a plurality of individual unit lenses comprising a total of N in number, said unit lenses hereinafter designated individually with numbers i=1 through N, said unit lenses substantially aligned along an axis, said i-th lens having a displacement $t_i$ orthogonal to said axis, with said axis located such that $$\sum_{i=1}^{N} t_i = 0;$$

wherein each of said unit lenses is made of lithium and has a refractive index decrement $\delta<1$ at a wavelength $\lambda<50$ Angstroms; and wherein the unit lithium lenses are held together by an adhesive.

27. A compound refractive lens for x-rays, comprising:

a plurality of individual unit lenses comprising a total of N in number, said unit lenses hereinafter designated individually with numbers i=1 through N, said unit lenses substantially aligned along an axis, said i-th lens having a displacement $t_i$ orthogonal to said axis, with said axis located such that $$\sum_{i=1}^{N} t_i = 0;$$

wherein each of said unit lenses is made of lithium and has a refractive index decrement $\delta<1$ at a wavelength $\lambda<50$ Angstroms; and wherein the unit lithium lenses held together using metal bonding method.

28. A compound refractive lens for x-rays, comprising:

a plurality of individual unit lenses comprising a total of N in number, said unit lenses hereinafter designated individually with numbers i=1 through N, said unit lenses substantially aligned along an axis, said i-th lens having a displacement $t_i$ orthogonal to said axis, with said axis located such that $$\sum_{i=1}^{N} t_i = 0;$$

wherein each of said unit lenses is made of lithium and has a refractive index decrement $\delta<1$ at a wavelength $\lambda<50$ Angstroms; and wherein the unit lithium lenses are held together by a fastener.

* * * * *